United States Patent [19]

Hanada et al.

[11] Patent Number: 4,618,089
[45] Date of Patent: Oct. 21, 1986

[54] APPARATUS AND METHOD FOR ASSEMBLING A STRUCTURE COMPRISING FRAMES AND SHELL PLATES

[75] Inventors: Sadashi Hanada, Miki; Akira Nakabayashi, Kobe, both of Japan

[73] Assignee: Kawasaki Jukogyo Kabushiki Kaisha, Kobe, Japan

[21] Appl. No.: 645,172

[22] Filed: Aug. 28, 1984

[30] Foreign Application Priority Data

Aug. 30, 1983 [JP] Japan .................. 58-158864

[51] Int. Cl.[4] ............................................ B23K 37/04
[52] U.S. Cl. ..................................... 228/212; 29/448; 29/281.3; 114/65 R; 114/77 R; 228/47; 228/6.1
[58] Field of Search .................. 228/4.1, 6.1, 47, 212; 29/448, 449, 281.3, 466, 469; 114/65 R, 77 R

[56] References Cited

U.S. PATENT DOCUMENTS

| | | | |
|---|---|---|---|
| 2,441,858 | 5/1948 | Watter | 29/449 |
| 3,708,100 | 1/1973 | Buchfuhrer et al. | 228/4.1 X |
| 3,759,207 | 9/1973 | Terai | 114/65 R |
| 3,795,968 | 3/1974 | Domanski et al. | 228/4.1 X |
| 3,872,815 | 3/1975 | Kawai et al. | 228/4.1 X |

Primary Examiner—Kenneth J. Ramsey

[57] ABSTRACT

An apparatus and method for assembling a structure comprising a framing and shell plates spread thereon. The apparatus has (a) a frame clamping device, which consists of a rectangular base, longitudinal girders arranged in parallel on both sides of the base and frame clamping jigs arranged on the base and longitudinal girders to place and clamp each member of the framing in given relative position, and (b) a structure assembling device, which consists of a stand whose top surface is of the same shape as a given outside surface of a shell plate, and shell tensioning jigs attached to the stand, to extend the roof shell plate placed on the stand while aligning the shell plate to proper position on the stand. The framing and shell plate are assembled by crowning the structure assembly device with the shell plate already set on it with the frame clamping device with the framing already set on it, placing the framing in relative position on the shell plate, and welding the shell plate to the framing.

2 Claims, 14 Drawing Figures

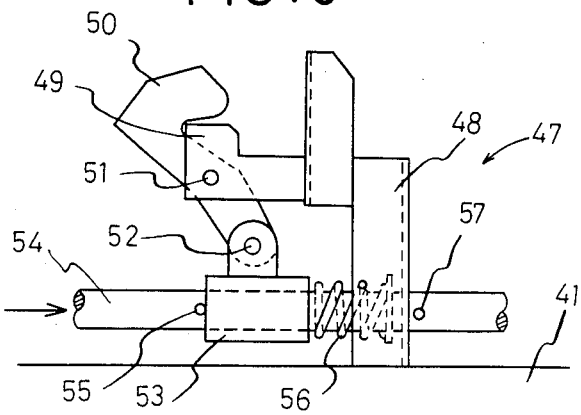
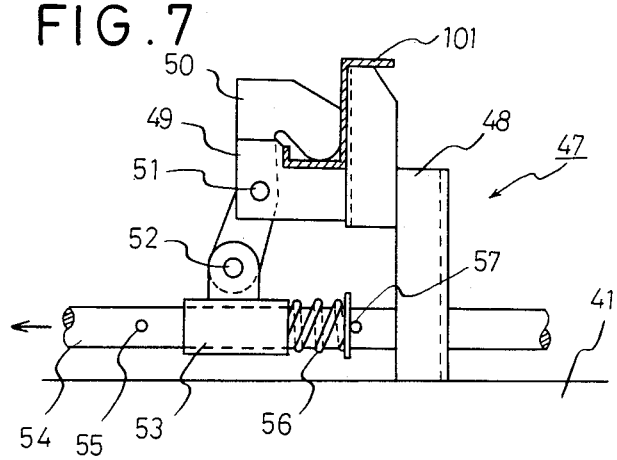

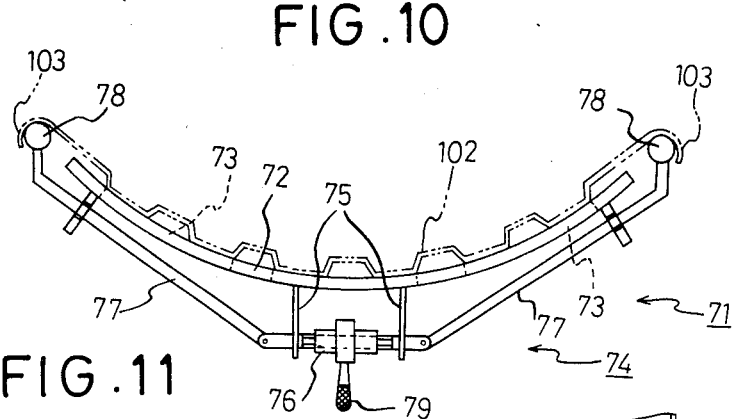
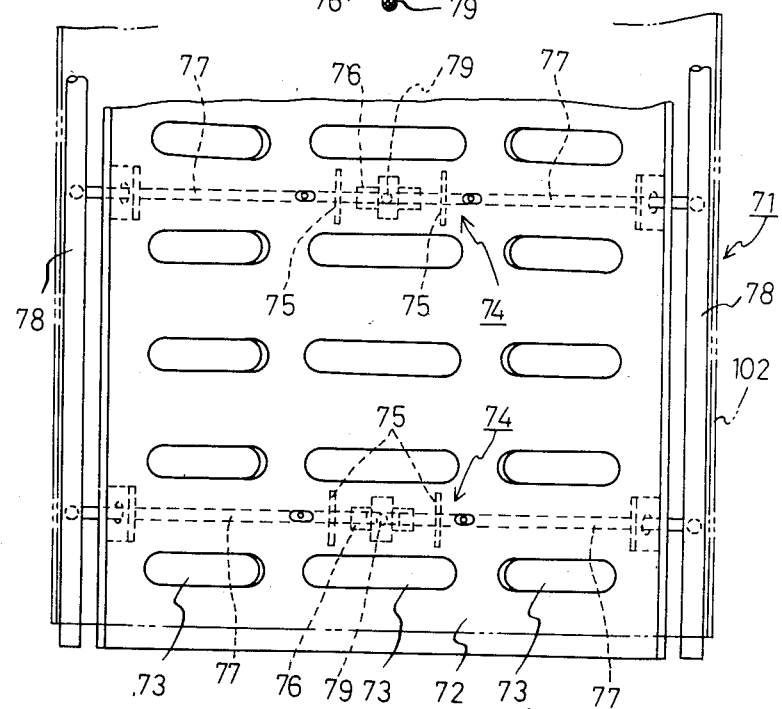

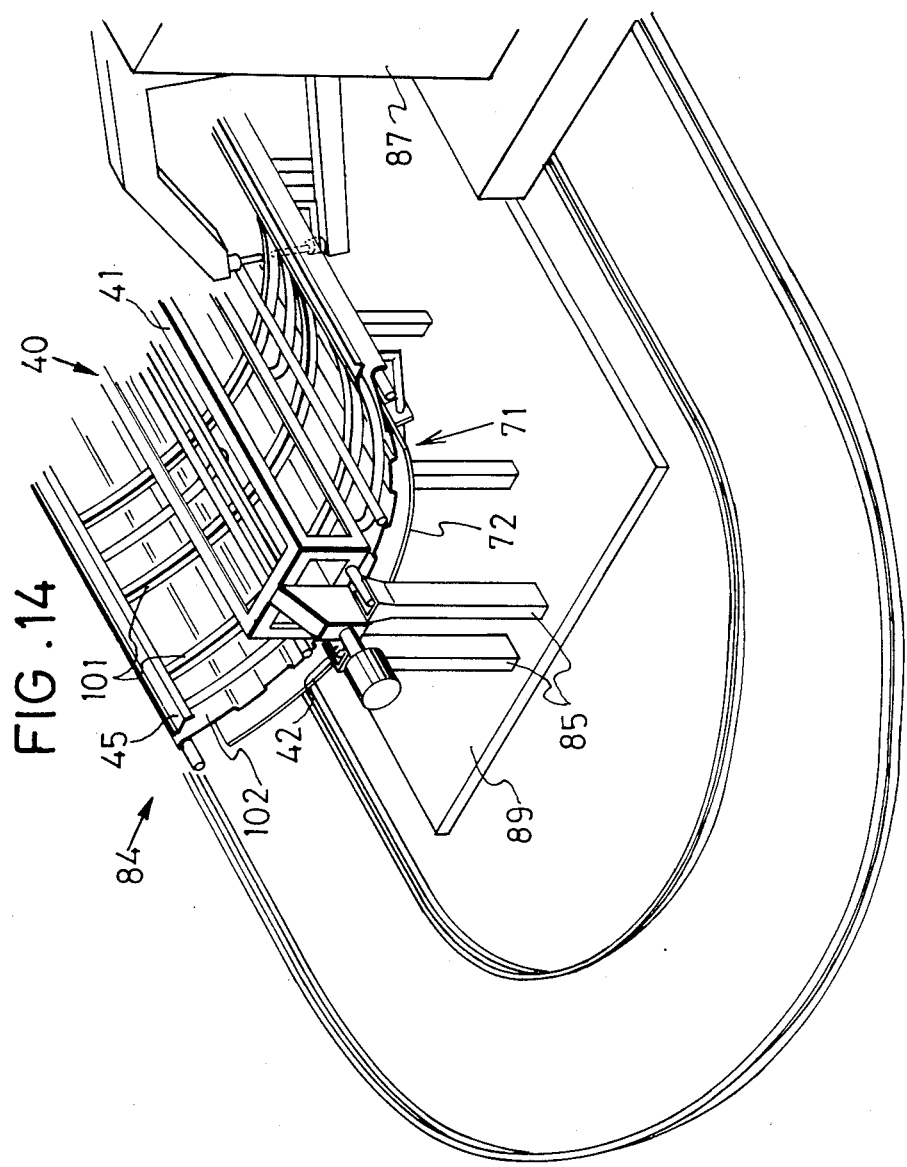

APPARATUS AND METHOD FOR ASSEMBLING A STRUCTURE COMPRISING FRAMES AND SHELL PLATES

BACKGROUND OF THE INVENTION

This invention relates to an apparatus and method for assembling structures comprising frames and shell plates spreading thereon, like bodies of rolling stock or other vehicles.

Common roof structures of rolling stock comprise a roof framing which consists of carlines 1, stringers 2 and cant rails 3, and roof sheets 4 spreading thereon, as shown in FIG. 1, or a roof framing which consists of carlines 1 and cant rails 3, and roof sheets 4 spreading thereon, as shown in FIG. 2.

Conventional assembling methods for vehicle roof structures thus arranged can be explained as follows:

With the case of roof structures shown in FIG. 1, carlines 1 are placed on positioners previously spaced at given intervals on a jig, clamped with hand vises, and welded to stringers 2, thus making a one-piece roof framing. The integrated roof framing is removed from the jig, turned over with crane or other handling devices, and placed on a stand for welding the back side of the framing to complete the assembly of the roof framing. After roof sheets 4 are placed upside down on a roof-sheet stand, the aforesaid framing is mounted on the roof sheets and tack welded to the sheets into one piece, which is transferred to a welding stand to be secured. Then the framing and roof sheets are spot welded to complete this type of roof structure.

With the case of roof structures shown in FIG. 2, first, cant rails 3 are placed and secured on a jig. Carlines 1 are placed on positioners prespaced on the jig at given intervals, and fastened with hand vises to be welded to cant rails 3. Roof sheets 4 are covered on the integrated framing and brought into a good contact with the carlines 1 while being extended with turnbuckle or other tensioners. Then the roof sheets 4 are tack welded to the carlines 1 in overhead position from under the roof sheets. In tack welding, the roof sheets 4 are manually pressed down from above the sheets with plumbs on to have a complete contact with the carlines 1. When the intermediate assembly has been finished, it is turned over with a crane or other handling devices and mounted on a stand to weld the carlines 1 and roof sheets 4, thus completing this type of roof structure.

Aforesaid conventional method for assembling was associated with such drawbacks as follows:

(a) A roof structure which contains stringers and cant rails as construction members may be easy to turn over and handle as an integrated framing, while a roof structure which consists of only carlines and roof sheets cannot be turned over and handled since only carlines as frame members do not permit a preassembly;

(b) It takes too much time to place and clamp each of many carlines;

(c) Not only does overhead tack welding carlines and roof sheets result in poor welds, but also a two-men operation must be performed, causing extra manpower since at that time the roof sheets must be pressed down to carlines from above to have a good contact between carlines and roof sheets;

(d) Thin-gage sheet metals of which carlines and roof sheets are generally made are likely to be penetrated by welding arc fusion in tack welding, causing poor quality;

(e) Roof sheets must be pulled at five or six places on each side with tensioners for their good contact to carlines, and the tensioning must be made while maintaining the alignment of carlines and roof sheets, thus resulting in labor-intensive and poor operation; and (f) In turning over roof framings or structures, the use of an overhead crane with slings looped around tends to deform them, and the operation not only takes time with four or five men attending but also is dangerous, giving rise to problems in view of safety. Particularly in the case of roof structures of the type of FIG. 2, carlines are sometimes attached to roof sheets in view of construction and operation, before they are connected with cant rails in vehicle assembling, thus giving rise to difficulties in setting each carline in position on the individual roof sheet.

SUMMARY OF THE INVENTION

To solve aforesaid drawbacks of the conventional technology gave rise to the present invention.

Thus it can be said that the purpose and object of this invention is to accomplish the assembly work with operational improvement, higher quality, and enhanced safety as well as labor- and time-saving, which are particularly effective for roof structures comprising only roof sheets and carlines.

To achieve aforesaid purpose, an apparatus according to this invention comprises a frame clamping device which consists of a rectangular case, longitudinal girders arranged in parallel on both sides of the case through support members, and frame clamping jigs arranged on aforesaid case and longitudinal girders to place and clamp each member of aforesaid roof framing in given relative position, a structure assembling device which consists of a stand whose top surface is of the same shape as a given outside surface of roof sheets, and shell tensioning jigs attached to the stand to extend roof sheets placed on said stand while aligning each sheet to the corresponding position of the stand, a crowning means which helps the structure assembly device containing aforesaid roof sheets already set, to be crowned with the frame clamping device containing aforesaid framing already set, so that the framing is placed in correct relative position on the sheets, and a welding means which welds the sheets to the framing as they are assembled.

An assembling method according to the invention using aforesaid apparatus thus constructed consists of the following steps:

(a) to place and clamp each member of aforesaid framing in given relative position by means of two or more frame clamping jigs mounted on a frame clamping device;

(b) to spread and extend roof sheets in corresponding positions on a stand mounted on a structure assembling device, the top surface of the stand being of the same shape as a given outside surface of sheets;

(c) to crown the roof sheets thus arranged, with the frame clamping device to which aforesaid framing has been set, so that the roof sheets and the framing can maintain given relative positioning; and (d) to weld the sheets and the framing.

BRIEF DESCRIPTION OF THE DRAWING

FIGS. 6, 7, 8 and 9 are side-views, illustrating the details of a clamping jig;

FIG. 10 is a front view of a structure assembling device;

FIG. 11 is a plan of aforesaid structure assembling device;

FIG. 14 is a perspective view showing the overall assembling apparatus.

DETAILED DESCRIPTION OF PREFERRED EMBODIMENT

The following explains in detail the embodiments and drawings of the invention:

An apparatus for assembly according to the invention consists of a frame clamping device, a structure assembling device, a crowning means which helps the structure assembling device with sheets already set to be crowned with the frame clamping device with frames set, and welding equipment.

Figure 3:
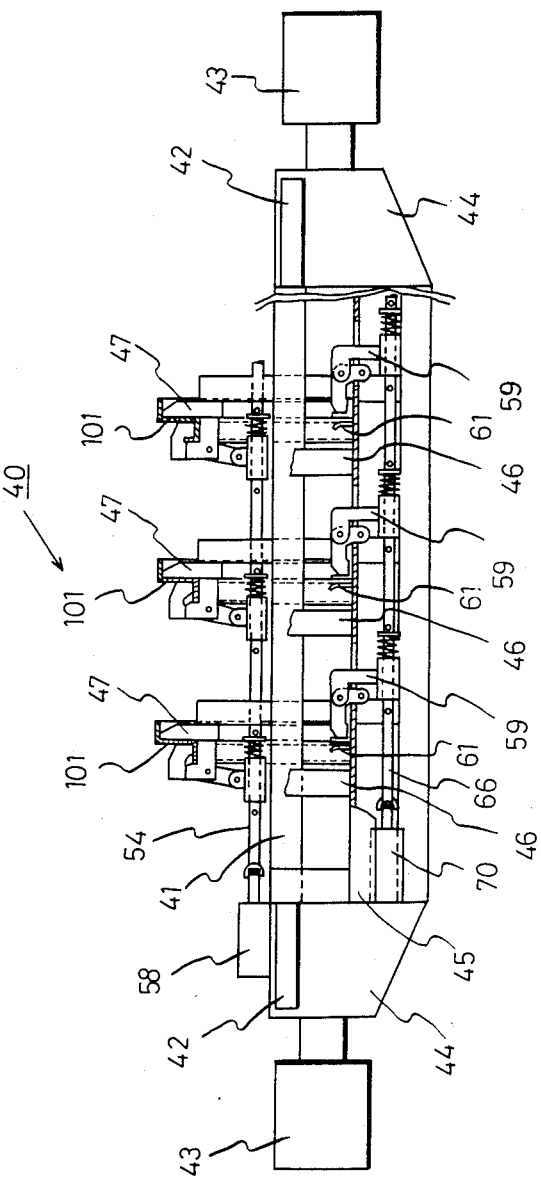
FIG. 3 is a side-view of main parts of a frame clamping device of an embodiment of the invention.
Figure 4:
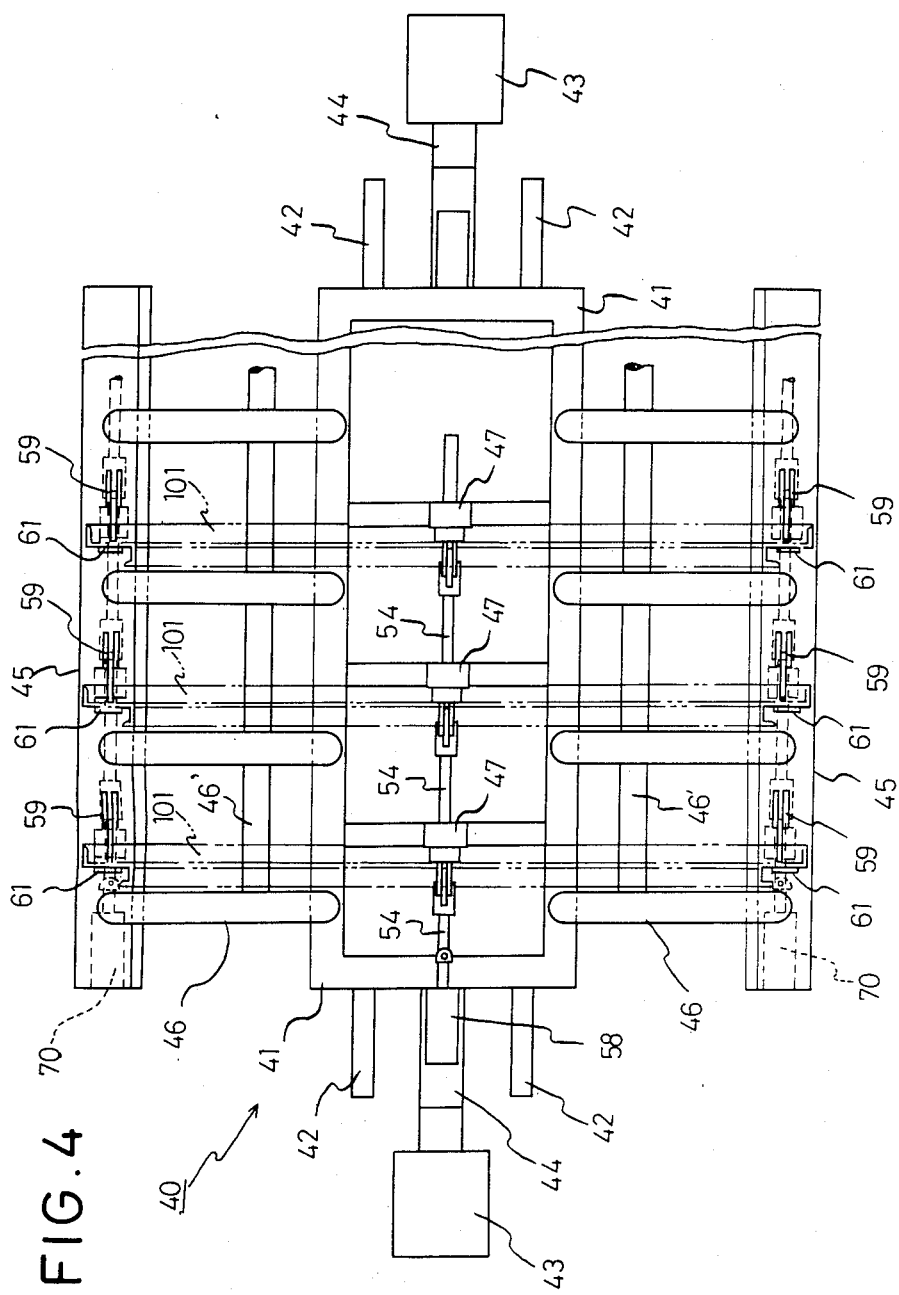
FIG. 4 is a plan of aforesaid frame clamping device.
Figure 5:
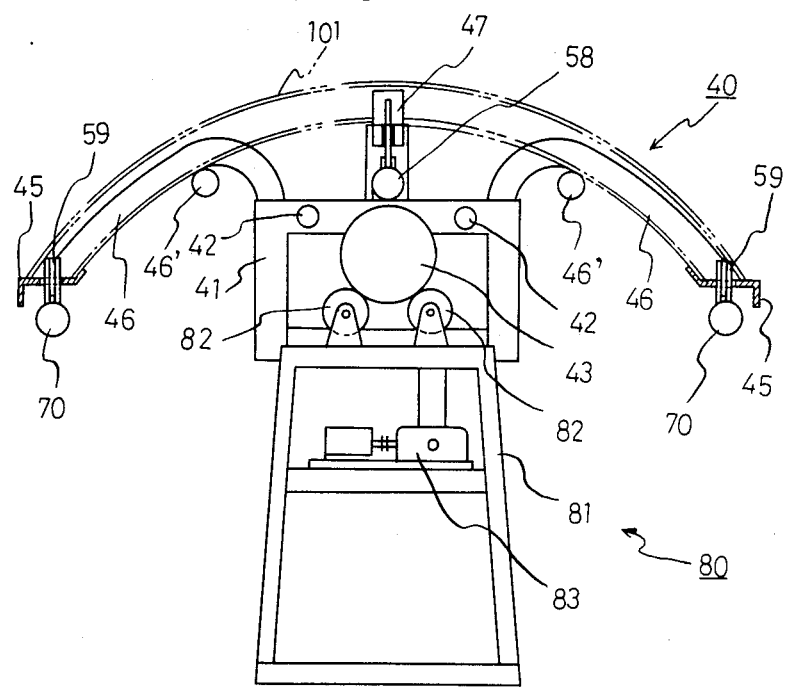
FIG. 5 is a front view showing the frame clamping device mounted on a turn-over device.
Figure 8:
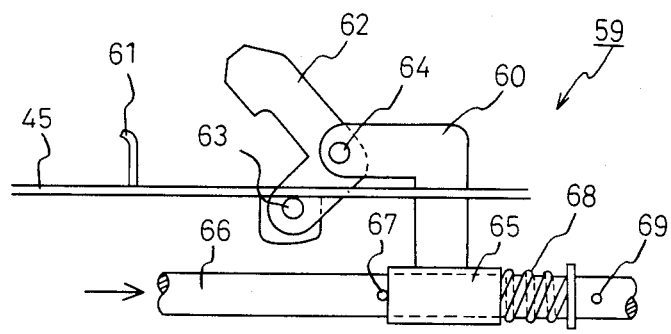
Figure 9:
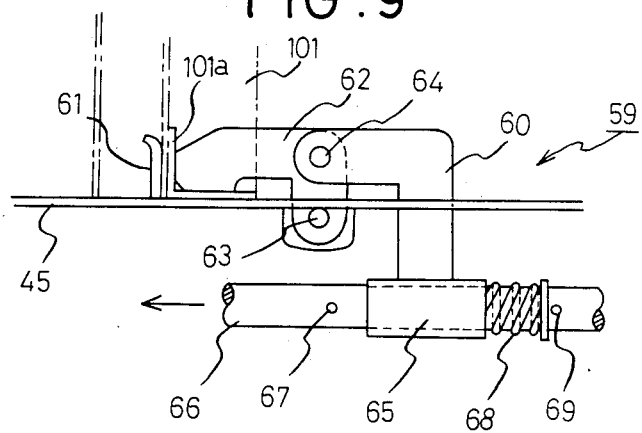

First FIGS. 3 to 9 illustrate a frame clamping device 40. In FIGS. 3, 4 and 5 a case 41 is made of rectangular frame structure, long enough to assemble roof structures of rolling stocks or other objects. At either end two support bars 42 sustaining the case are placed respectively in position suited for supporting the case horizontally. Rotatable shafts 43 are mounted through support blocks 44. On either transverse side of the case 41 a longitudinal girder 45 is fixed in parallel to the longitudinal direction of the case 41 through support frames 46 and 46'. On the centerline of the top surface of the case 41, there are arranged top clamping jigs 47 in the longitudinal direction of the case, spaced at given intervals, which help to clamp the top of frame members such as carlines. FIGS. 6 and 7 are the detail drawings of the top clamping jig 47 which consists of a support 48, a holder 49 and a clamp 50. The holder 49 is attached to the case 41 through support 48, and the clamp 50 is rotatably connected to the holder by a pin 51 as well as attached through a pin 52 to a sleeve 53 which is fit into a connecting bar 54 placed longitudinally on the case 41. The sleeve 53 can slide on the connecting bar 54, one end of the sleeve is stopped by a stopper 55 embedded in the connecting bar 54, and the other end is stopped through a spring 56 by another stopper 57 embedded in the connecting bar 54. In clamping a carline or another member 101, in FIG. 7 the connecting bar 54 moves toward the left as shown, the stopper 57 pushes the sleeve 53 through the spring 56, and the clamp 50 pivots on the pin 51 to clamp the member 101 between the holder 49. The spring 56 is installed as a bumper so that members may not be forcibly held. In releasing a clamped member, as in FIG. 6, the connecting bar 54 moves to the right direction as shown, the sleeve 53 is pushed by the stopper 55, and the clamp 50 pivots on the pin 51 to release the clamp on a member. In addition, the connecting bar 54 is connected to a pneumatic or hydraulic cylinder 58 mounted on one end of the case 41. An operation of the cylinder 58 enables a train of top clamping devices to be clamped or released at the same time. On the other hand, end clamping jigs 59 are arranged on the longitudinal girders so as to keep the same spacing as that of the top clamping jigs 47. FIGS. 8 and 9 are the detail drawings of the end clamping jig which consists of another support 60, another holder 61, and another clamp 62. The holder 61 is attached to the longitudinal girder 45, the clamp 62 is retained on the longitudinal girder 45 through another pin 63 as well as retained to another sleeve 65 through another pin 64 and support 60. The sleeve 65 is fit into another connecting bar 66 for sliding, which runs longitudinally under a longitudinal girder 45. One end of the sleeve 65 is stopped by another stopper 67 embedded in the connecting bar 66, and the other end is stopped through another spring 68 by another stopper 69 embedded in the connecting bar 66. When clamping an end of a frame member such as carline 101, as shown in FIG. 9, first place the end of carline 101 on the longitudinal girder 45 and against the holder 61. A movement of the connecting bar 66 toward the left allows the stopper 69 to push the sleeve 65 through the spring 68 and further press down the clamp 62 through the support 60. The clamp 62 pivots on the pin 63 to clamp the end of a frame 101, more particularly a lug piece 101a in this case between the longitudinal girder 45 and the holder 61, while the spring 68 functions to retard shock during frame clamping, like the spring 56 for the top clamping jig. In releasing frame clamping, as shown in FIG. 8, a movement of the connecting bar 66 to the right allows the stopper 67 to push the sleeve 65, the clamp 62 to release frame clamping. The connecting bar 66 is connected to a pneumatic or hydraulic cylinder 70 mounted on an end of longitudinal girder 45. An operation of the cylinder 70 enables a train of end clamping jigs 59 to clamp or release at the same time. The spacing of longitudinal girders on both sides, the relative position between the top clamp jigs 47 and end clamping jigs 59, and the numbers and spacing of aforesaid clamp jigs 47 and 59 are respectively determined according to the design of a framing assembled by this apparatus. The rotatable shaft 43 is placed near the gravity center of the apparatus in view of the balance of the apparatus at the time of rotation when the apparatus with frames assembled is turned over around the rotatable shaft 43.

Now we will illustrate a structure assembling device 71. In FIGS. 10 and 11, a holding plate 72 is previously wrought into shape to suit the shape of a structure such as roof sheets to be assembled on this holding plate, and has a number of work slots 73 in use for welding frames to roof sheets and other workpieces. In the center of the convex side of the holding plate 72 (the center of the bottom in FIG. 10), tension jigs 74 are properly spaced in the longitudinal direction of the holding plate 72. Each tension jig is secured to a turn-buckle 76 held by supports 75, and to tension bars 78 placed at either end of the transverse direction of the holding plate through connecting bars 77. The tension bars 78 are so constructed that an operation of a ratchet handle 79 fixed to the turn-buckle 76 projects the tension bars outwardly symmetrically to the holding plate 72.

In FIG. 5, 80 is a turn-over device for aforesaid frame clamping device 40. Two rollers 82 are placed on a pedestal 81 and have a driving device 83. Two turn-over devices 80 are used as a pair to turn over the frame clamping device 40. Rotatable shafts 43 arranged at both ends of the frame clamping device 40 are horizontally placed on rollers for four-point support. The surface of the rollers 82 has a rubber lining or other coating to increase friction force with the rotatable shaft 43.

Figure 12:
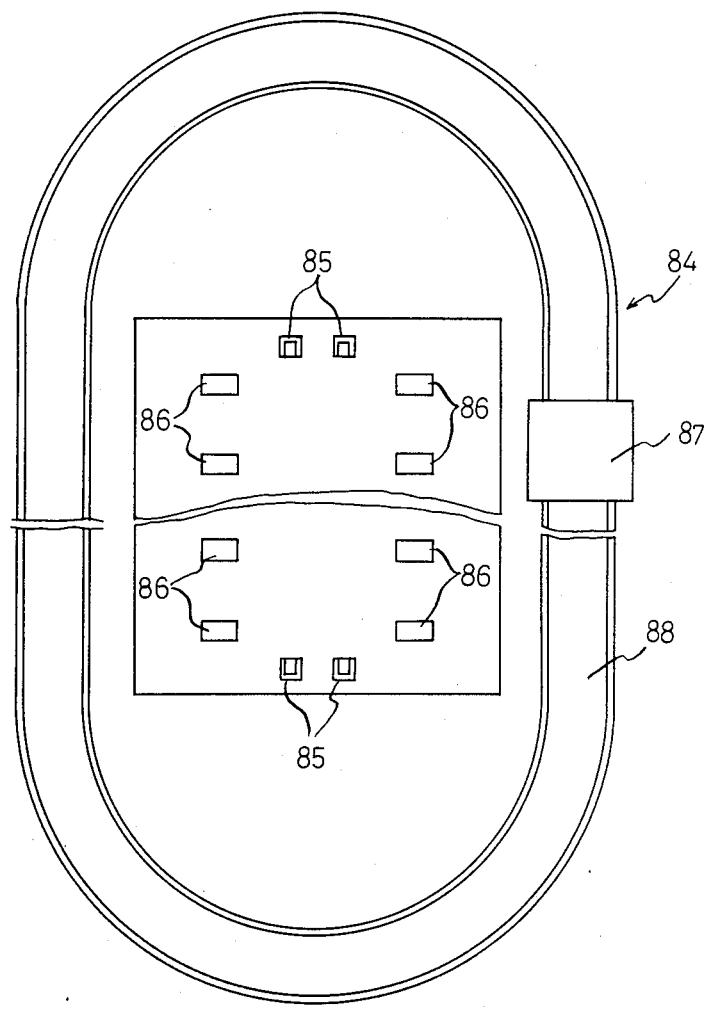
FIG. 12 is a plan of an overall assembling device.
Figure 13:
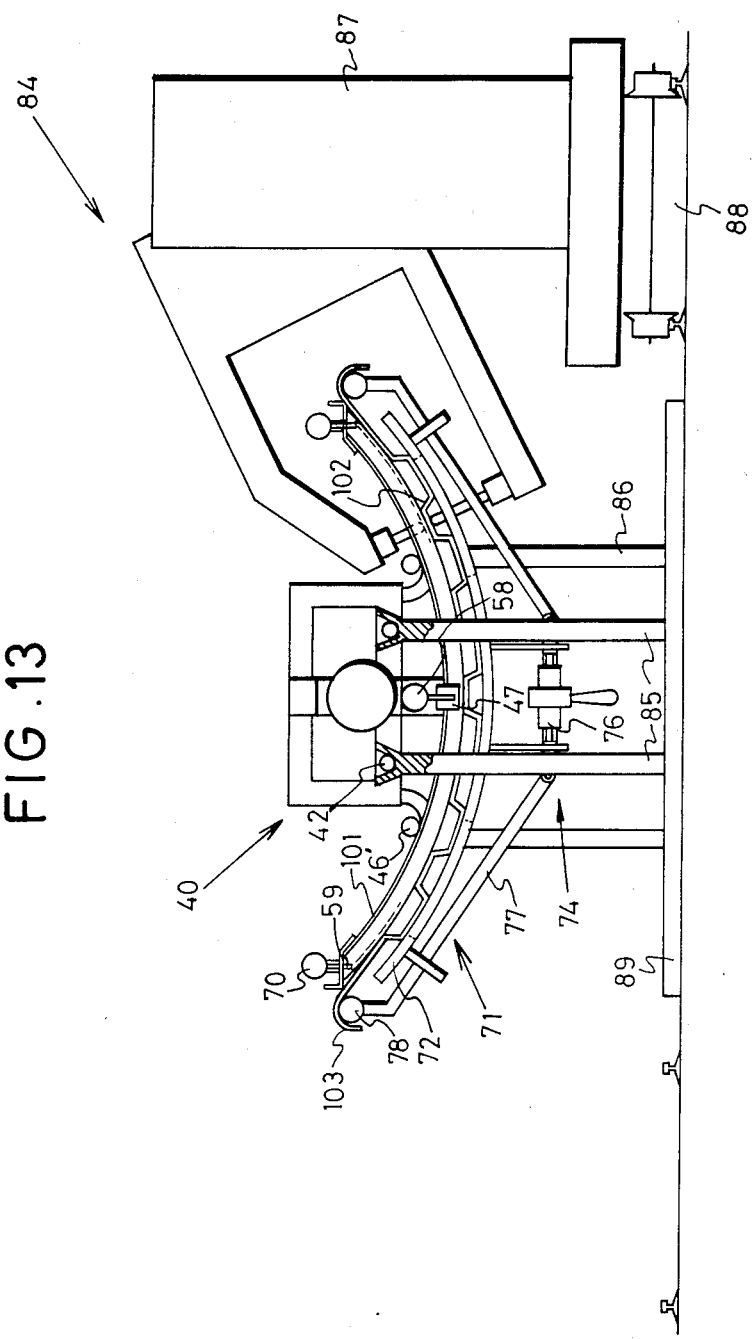
FIG. 13 is a front view of the overall assembling device.

FIGS. 12 and 13 show an overall assembly apparatus. FIG. 12 is the plan and FIG. 13 is the front view. The overall assembly apparatus consists of frame clamping device support blocks 85, structure assembling device support blocks 86, spot welder(s) 87, and welder rails 88. The frame clamping device support blocks 85 and the structure assembling device support blocks 86 are both placed on a base plate 89, the former support blocks support a frame clamping device 40 horizontally through support bars, with the support bar insertion portion at the top of the support blocks tapered trapezoidally for easy insertion and for maintenance of installation accuracy after insertion. The structure assembling device support blocks are designed to support a structure assembling device 71 on the base plate, and are machined as well as placed to have an accurate dimension and shape in relation to the frame clamping device 40, and to have the shape of the holding plate 72 maintain an accurate assembly with the frame clamping device 40. At the periphery of the base plate 89 is placed a spot welder which welds frames to roof sheets, and rails 88 on which the welder 87 travels around the overall assembly apparatus 84.

Figure 1:
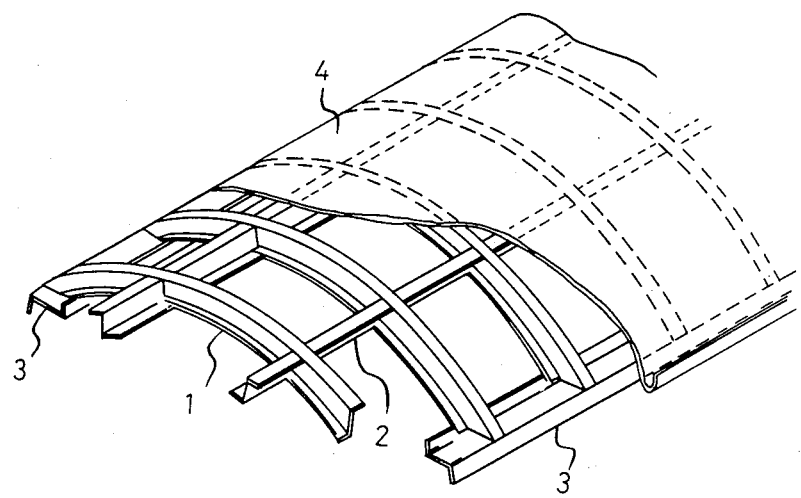
FIGS. 1 and 2 are perspective views which show the outline construction of rolling stock roof structures, exemplifying structures to which an apparatus and method according to the invention apply.
Figure 2:
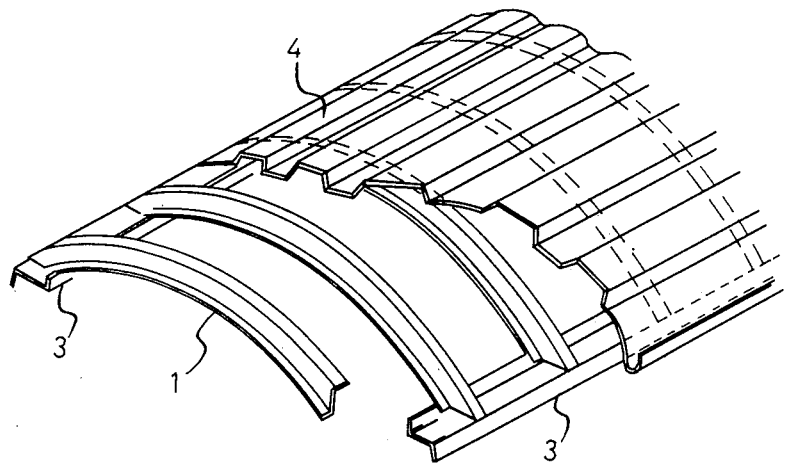

An embodiment of the assembling method according to the invention is explained in detail based on the drawings, taking into consideration an assembly of the rolling stock roof structure shown in FIG. 2 by means of aforesaid apparatus. First, the top clamping jigs 47 and end clamping jigs 59 on a frame clamping device 40 as shown in FIGS. 3, 4 and 5 are respectively placed with the clamps released, as shown in FIGS. 6, 7 and 8. Then frames such as carlines 101 are arranged one by one of the clamping jigs as required, while it is necessary for each frame 101 to be placed accurately against the top and end clamping jigs 47 and 59 at a minimum of three places of holders 49 and 61 (further at two places of support frames 46' too if required). Next an actuation of the cylinders 58 and 70 allows frames 101 to be clamped at the same time by actuating the jigs 47 and 59, thus completing the setting of frames 101. If a framing includes stringers, they can be installed after the setting of carlines is over. If there are cant rails, they can be installed after the the frame clamping device (later referred to) has been turned over. And this frame clamping device is lifted by a crane or other handling device and placed on a turning-over device 80 for turning. By the way, the frame clamping device 40 may be placed on the turning-over device 80 before frames 101 are set on the clamping device, with a safety measure provided so that the frame clamping device may not turn over due to its own weight. After such arrangement has been made, one can proceed to place frames 101, thus eliminating the need for lifting with a crane.

Now we will explain how to assemble roof sheets 102, using FIGS. 10 and 11. Roof sheets 102 are spreaded on a structure assembling device 71 which has been accurately placed in a given position on structure assembly support blocks 86 of an overall assembly apparatus 84. Bent portions 103 at both ends of roof sheets are held with tension bars 78 on tension jigs 74. Extending the tension bars by turn-buckles 76 through connecting bars 77 projects out both of the tension bars 78 by the same amount, thus permitting each roof sheet to be pulled from both sides and accurately aligned to the center of the holding plate 72. If no bent portions are provided at the ends of roof sheets, a provision of vises on tension bars 78 enables the ends to be directly held and pulled.

Then, as shown in FIG. 14, the frame clamping device 40, which has been set with a framing and turned over, is lifted with a crane, carried and placed on the structure assembly device 71 preset with roof sheets 102, while support bars are inserted into support blocks 85. The positive fit of the support bars 42 on the frame clamping device 40 into the support blocks insures the alignment of the centers of structure assembly device 71 and frame clamping device 40 as well as the maintenance of the height of the support blocks to keep proper surface pressure between roof sheets and frames. After the installation has been performed as stated, roof sheets 102 are welded to frames 101 using a welder 87 to complete a roof structure. Before this welding, the location and size of the slots in the holding plate has been so set that the lower electrode can have access to roof sheets and frames. Rails are so provided around the apparatus that the welder 87 can travel around, thus enabling the welding at both sides of the apparatus with one welder.

Use of electromagnets or permanent magnets on aforesaid frame clamping device rather than mechanical tightening jigs as, that is, the top clamping jig 47 and the end clamping jig 59, allows frames to be placed on the frame clamping device as it is turned over, thus eliminating the need for turn-over operation in the assembly.

In aforesaid embodiments, clamping jigs 47 and 59 are preset on a case 41 or longitudinal girders 45 at given intervals, but a provision of longitudinal movement for jigs allows the spacing of frames arranged in parallel to be set freely if desirable.

Furthermore, providing a pedestal 81 of a turn-over device 80 with vertical movement, and placing the pedestal on a base plate 89 of an overall assembly apparatus provide for integration of a frame clamping device 40, a structure assembly device 71, a turn-over device 80 and an overall assembly apparatus 84, thus eliminating the need for transport operation with a crane, since clamping and turning-over frames, assembling a roof structure, and connecting the structure to the framing are all possible on one apparatus.

An assembly apparatus and method embodying the invention can apply not only to the assembly of rolling stock roof structures, but also to the assembly of land and marine vehicle bodies and buildings where the identical shape or size of frames are continually placed and shell plates are spread on the frames for assembly.

As mentioned above, the assembly apparatus and method embodying the invention can substantially minimize the man-power required for intermediate assembly work where the traditional technology needed a lot of man-power, and maintain and improve the accuracy of frame spacing by means of the jigs as well as help readily and visually see if frames are improperly bent or placed, thus leading to an early finding of poorly bent frames, since frames are supported at three or more points on the assembly apparatus when set on it. Further the flat position placing of frames and the flat position welding provide for better and one-arm operation. The apparatus and method makes turn-over work easier, yields no distortion in turning-over, and maintains safety, thus resulting in labor-saving, improved workmanship and safety as well as leading to better product quality.

What is claimed is:

1. A method of assembling a structure consisting of a plurality of frames and at least one shell plate on said frames, comprising the steps of:

clamping the plurality of frames in given relative position to each other on a rigid clamping structure by releasable clamping means mounted on said clamping structure;

mounting the at least one shell plate in a predetermined form on a stand;

placing the assembled frames while clamped on said clamping structure on the at least one shell plate mounted on the stand so that said shell plate and said frames have a given relative position;

welding the frames while clamped on said clamping structure to the at least one shell plate mounted on the stand;

and releasing the clamping means and thereby the frames from the clamping structure.

2. An apparatus for assembling a structure consisting of a plurality of frames and at least one shell plate on said frames, comprising:

a frame assembling structure formed as a rigid frame structure having a plurality of releasable frame clamping jigs mounted on said rigid frame structure, for placing and clamping the frames in given relative position to each other;

a stand having means for mounting the at least one shell plate thereon;

means for placing said rigid frame structure, with the frames clamped on said frame structure, on said stand, with said at least one shell plate mounted on said stand; and welding means for welding said frames to said plate.

* * * * *